United States Patent [19]

Smith, Jr.

[11] Patent Number: 5,709,399

[45] Date of Patent: Jan. 20, 1998

[54] MOTOR VEHICLE STEERING ASSEMBLY

[76] Inventor: Joseph E. Smith, Jr., 24 Newhall Rd., Hilton Head, S.C. 29928

[21] Appl. No.: 658,548

[22] Filed: Jun. 5, 1996

[51] Int. Cl.$^6$ .................................................. B62D 7/18
[52] U.S. Cl. .......................................... 280/96.1; 280/673
[58] Field of Search ............................. 280/96.1, 673, 280/433

[56] References Cited

U.S. PATENT DOCUMENTS

| | | | |
|---|---|---|---|
| 3,388,923 | 6/1968 | Maynard | 280/96.1 |
| 3,479,051 | 11/1969 | Weiss | 280/96.1 |
| 3,807,765 | 4/1974 | Pokornicki | 280/433 |
| 3,915,469 | 10/1975 | Vanice | 280/96.1 |
| 4,229,017 | 10/1980 | Hagedorn | 280/96.1 |
| 4,254,967 | 3/1981 | Scanlon | 280/433 |
| 4,635,952 | 1/1987 | Smith | 280/96.1 |
| 4,798,394 | 1/1989 | Pollock et al. | 280/96.1 |
| 5,052,203 | 10/1991 | Van Cuyk | 70/232 |

*Primary Examiner*—Kenneth R. Rice
*Attorney, Agent, or Firm*—Young & Basile, P.C.

[57] ABSTRACT

A motor vehicle steering assembly comprising a steering knuckle including a spindle and upper and lower yoke arms receiving a free end of an axle therebetween; upper and lower bushings positioned in upper and lower bores in the upper and lower yoke arms and each having notches in an outboard peripheral edge thereof for engagement by a spanner wrench; a kingpin having upper and lower portions journaled in the upper and lower bushings and an intermediate portion passing through a bore in the axle free end; first and second axially spaced external circumferential grooves in the intermediate portion; first and second lock pins adapted to pass through transverse bores in the axle free end for locking coaction with the circumferential grooves; numerical indicia on one end of the kingpin indicating the annular position of the kingpin relative to the axle; and a socket in one end of the kingpin for receipt of an Allen head wrench. When a measured amount of wear has occurred at the high wear locations on the interface between the kingpin and the bushings, the Allen head wrench is inserted in the socket in the kingpin to move the kingpin through 90° to move relatively unworn portions of the kingpin into the high wear locations and the spanner wrench is engaged with the notches in the bushings to move the bushings through 90° to bring relatively unworn portions of the bushings into the high wear locations. Alternatively, the first and second circumferential grooves may be replaced with first and second axially spaced pairs of flats on the intermediate portion of the kingpin with the flats of each pair of flats angularly spaced with respect to each other. These arrangements and methodology effectively double the life of the kingpin and bushings.

24 Claims, 3 Drawing Sheets

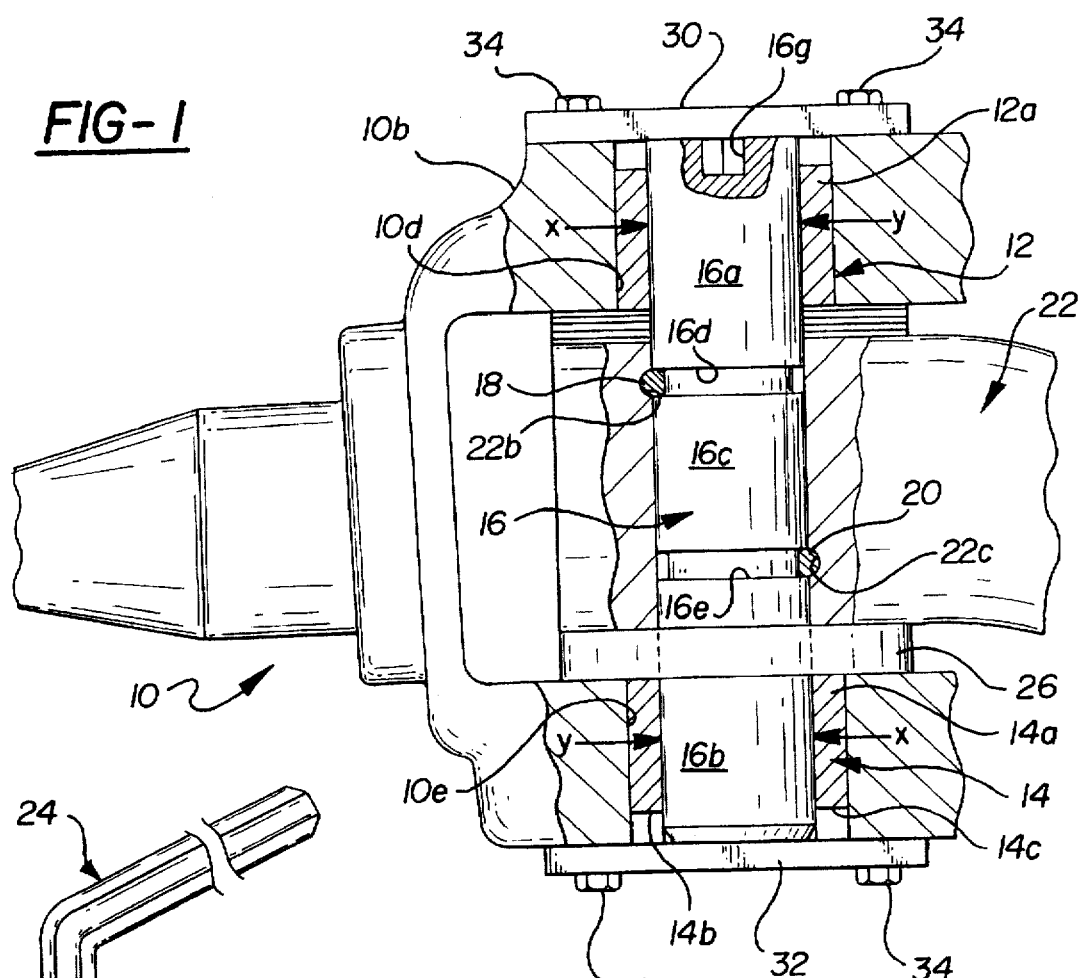
FIG-1
FIG-2
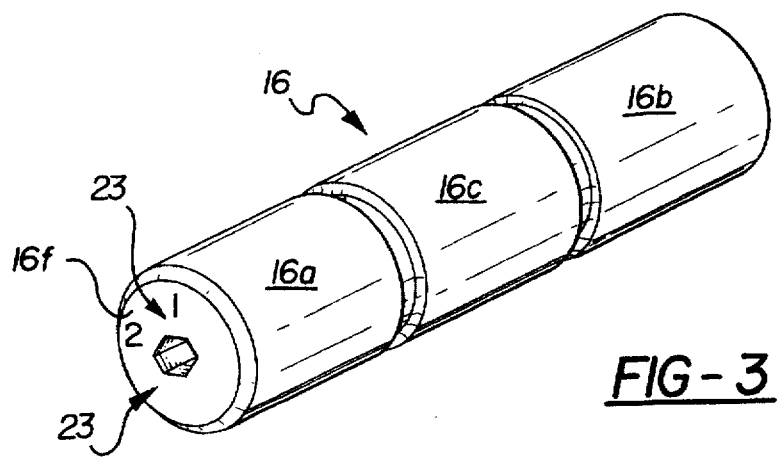
FIG-3

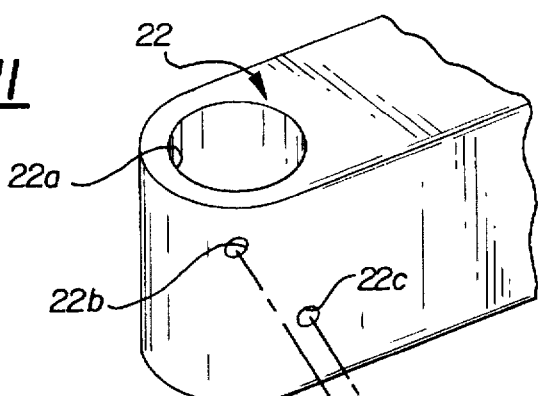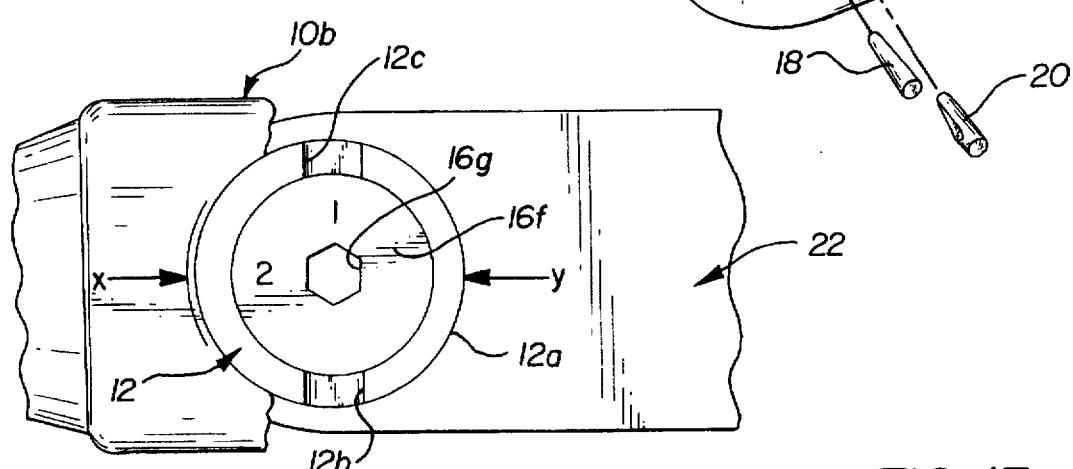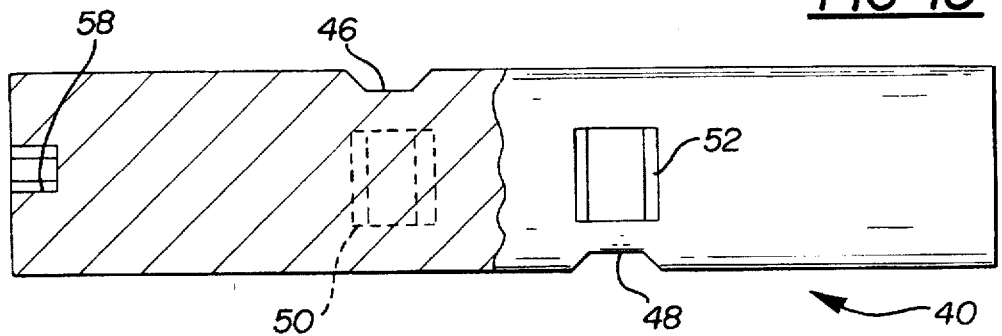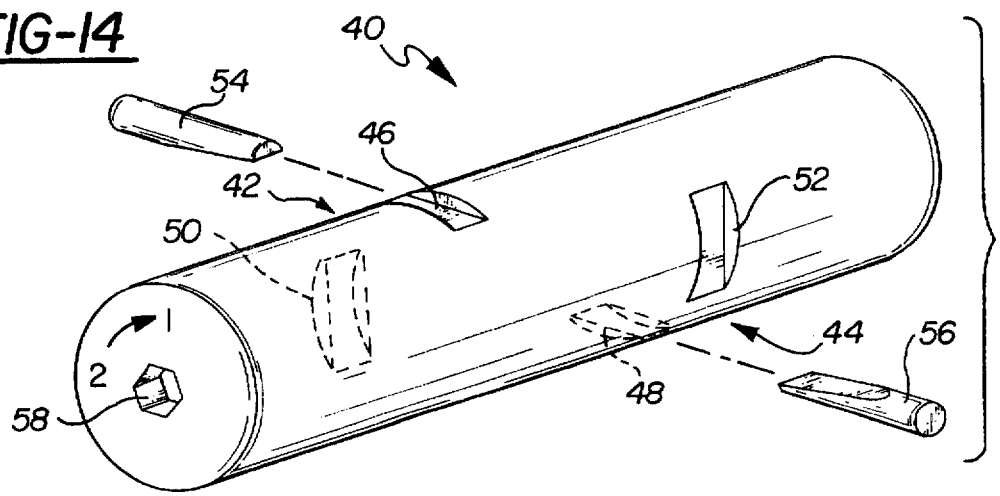

MOTOR VEHICLE STEERING ASSEMBLY

BACKGROUND OF THE INVENTION

This invention relates to motor vehicle steering assemblies and more particularly to steering assemblies especially suitable for use with heavy duty motor vehicles employing a solid front axle.

Steering knuckle and kingpin assemblies, commonly used in heavy motor vehicles such as trucks and the like, consist generally of a generally cylindrical kingpin fastened through a substantially vertical bore in an end of the vehicle front axle and a steering knuckle pivotal relative to the kingpin. The knuckle has an integral upper yoke arm and an integral lower yoke arm that straddle the axle and are journaled, respectively, on the portions of the kingpin projecting above and below the axle. Bushings are fixedly mounted in the bores in the yoke arms to journal the projecting upper and lower ends of the kingpin. The kingpin is fixedly mounted in the axle by axially spaced and diametrically opposed lock pins which pass through suitable transverse bores in the axle for respective locking engagement with axially spaced and diametrically opposed flats provided on the intermediate portion of the kingpin positioned within the axle. Since the kingpin is thus fixedly positioned in cantilever fashion relative to the steering knuckle, the maximum wear of the kingpin takes place on the outboard surface of the upper kingpin portion and the inboard surface of the lower kingpin portion. This wear requires that the kingpin and bushing assembly be replaced at relatively frequent intervals of vehicle usage. This replacement is expensive both in terms of the cost of the new kingpin and bushing parts that must be supplied as well as in terms of the amount of labor and downtime of the vehicle required to disassemble the steering assembly and remove the worn parts and then reassemble the steering assembly with the new parts.

SUMMARY OF THE INVENTION

This invention is directed to the provision of an improved motor vehicle steering assembly.

More particularly, this invention is directed to the provision of an improved motor vehicle steering assembly which provides significantly longer wear life for the kingpin and/or the related bushings.

The invention is intended for use with a motor vehicle steering assembly of the type including a steering knuckle including upper and lower yoke arms vertically spaced to receive the free end of an axle therebetween; upper and lower bushings mounted in bores in the upper and lower yoke arms; a kingpin having upper and lower portions journaled in the upper and lower bushings and an intermediate portion passing through a bore in the axle free end; and at least one lock pin adapted to pass through a bore in the axle free end for locking coaction with locking means on the kingpin.

According to the invention, the steering assembly includes indicia means on the kingpin indicating the angular position of the kingpin relative to the axle and means for rotating the kingpin to a new angular position relative to the axle in compensation for wear between the kingpin and the bushings. With this arrangement, and following a period of usage of the steering assembly sufficient to generate wear as between the kingpin and the bushings, the lock pin may be withdrawn from locking engagement with the kingpin, the kingpin may be rotated to a new angular position relative to the axle as determined and confirmed by the indicia on the kingpin, and the lock pin may thereafter be lockingly reengaged with the kingpin. The steering assembly is now ready for a further period of usage, thereby essentially doubling the life of the kingpin.

According to a further feature of the invention, the means for rotating the kingpin comprises a socket provided on one end of the kingpin for receipt of a suitable tool. With this arrangement, a tool such as an Allen head wrench may be readily inserted into the socket in the end of the kingpin to rotate the kingpin to its new position following wear in its original position.

According to a further feature of the invention, the locking means on the kingpin comprises an external circumferential groove in the intermediate portion of the kingpin for coaction with the lock pin. This arrangement allows the lock pin to readily engage the locking means on the kingpin irrespective of the angular position of the kingpin relative to the axle, thereby enabling the kingpin to be rotated to a new position following wear and lockingly reengaged with the lock pin with the lock pin now coacting with a different angular location on the circumferential groove.

In one disclosed embodiment of the invention, there are two lock pins and two axially spaced circumferential grooves in the kingpin for respective locking coaction with the two lock pins. The two lock pins respectively reorient themselves angularly with respect to the circumferential grooves as the kingpin is rotated to its new wear position, whereafter the lock pins are retightened to lock the kingpin in its new angular position.

In another disclosed embodiment of the invention, there are two lock pins and first and second axially spaced pairs of flats on the kingpin with the two flats of each pair angularly spaced from each other and the corresponding flats of the first and second pairs diametrically opposed to each other. In the original angular position of the kingpin the two pins respectively engage a first flat of the first pair and a first flat of the second pair diametrically opposed to the first flat of the first pair and, after the kingpin is rotated to its new wear position, the two pins respectively engage a second flat of the first pair and a diametrically opposed second flat of the second pair.

According to a further feature of the invention, the assembly further includes means for rotating the bushings relative to the respective yoke arm so as to selectively alter the angular position of the bushings relative to the axle in compensation for wear between the kingpin and the bushings. With this arrangement, the bushings may be rotated to a new wear position at the same time that the kingpin is being rotated to a new wear position, thereby doubling the life of the entire kingpin assembly and essentially eliminating the need for disassembling the steering mechanism when rotating the kingpin to its new wear position. In the disclosed embodiment of the invention, the bushing rotating means comprises notches in an outboard peripheral edge of each bushing for engagement by a suitable spanner wrench.

The invention also provides a method of increasing the wear life of a kingpin for use in a motor vehicle steering assembly of the type including a steering knuckle having upper and lower yoke arms vertically spaced to receive the free end of an axle therebetween; upper and lower bushings respectively positioned in the upper and lower bores in the upper and lower yoke arms; a kingpin having upper and lower portions journaled in the upper and lower bushings and an intermediate portion between the upper and lower portions; and a lock pin passing through a bore in the axle free end for locking coaction with the kingpin intermediate portion to preclude rotation of the kingpin relative to the axle.

The invention methodology includes the steps of providing indicia proximate one end of the kingpin to indicate the angular position of the kingpin relative to the axle; providing means proximate one end of the kingpin to rotate the kingpin relative to the axle; mounting the kingpin in the steering assembly with the upper and lower kingpin portions journaled in the upper and lower bushings and the intermediate portion passing through the bore in the axle free end with the lock pin lockingly engaging the intermediate portion; and, after a period of usage of the steering assembly sufficient to generate wear as between the kingpin portions and the respective bushings, moving the lock pin to an unlocked position with respect to the intermediate portion of the kingpin, utilizing the rotating means to rotate the kingpin to a new angular position relative to the axle as determined and confirmed by the indicia means, and moving the lock pin to a locked position with respect to the intermediate portion of the kingpin to lock the kingpin in its new angular position relative to the axle. This methodology essentially doubles the life of the kingpin by allowing the kingpin to be moved following usage from an angular position where selected portions of the kingpin receive maximum wear to an angular position where new, unworn portions receive maximum wear.

According to further feature of the invention methodology, the method includes the further steps of providing a circumferential groove in the intermediate portion of the kingpin for locking coaction with the lock pin; loosening the lock pin relative to the circumferential groove to achieve the unlocked position of the lock pin; and, following rotation of the kingpin to its new angular position, tightening the lock pin relative to the circumferential groove to achieve the locked position of the lock pin. This methodology provides a ready and convenient means of locking the kingpin in both its original and its new angular positions utilizing the same lock pin and the same locking means on the kingpin.

According to a further feature of the invention methodology, the methodology includes the further steps of providing means on each bushing to rotate the respective bushing relative to the axle and, after the period of usage, rotating the bushings to new angular positions relative to the axle. This methodology allows the wear life on both the kingpin and the bushings to be effectively doubled and eliminates the need to disassemble the steering assembly when rotating the kingpin to its new angular position.

In the preferred embodiment of the invention methodology, the kingpins and the bushings are rotated after the period of usage by approximately equal angular extents such, for example, as 90°. This has the effect of moving the highest wear points on the kingpin and on the bushings to new angular locations where they will receive minimal wear during the subsequent period of usage and moving new relatively unworn points on the kingpin and on the bushing to locations of highest wear.

BRIEF DESCRIPTION OF THE DRAWINGS

FIG. 1 is a fragmentary view of a motor vehicle steering assembly according to the invention;

FIG. 2 is a detail perspective view of a tool for use in association with the steering assembly of FIG. 1;

FIG. 3 is a detail perspective view of a kingpin employed in the steering assembly of FIG. 1;

FIG. 11 is a detail perspective view further illustrating the locking action of the lock pins;

FIG. 12 is a detail top view of the kingpin and associated upper bushing;

FIG. 13 is a fragmentary side view of a modified kingpin for use in carrying out the invention and;

FIG. 14 is a perspective view of the kingpin of FIG. 13.

DETAILED DESCRIPTION OF THE PREFERRED EMBODIMENT

Figure 4:
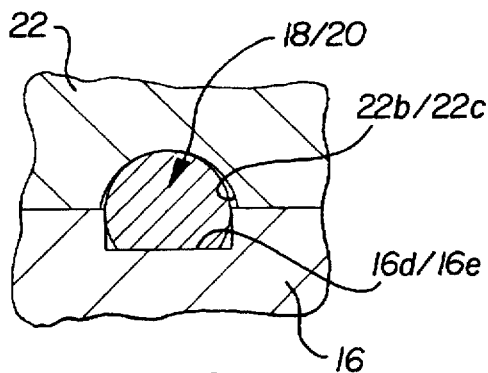
FIG. 4 is a detail view of a lock pin arrangement employed in the steering assembly of FIG. 1.
Figure 5:
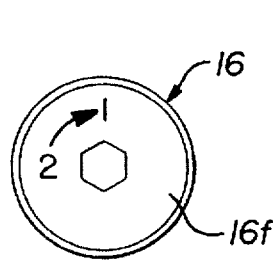
FIGS. 5 and 6 are progressive views showing indicia employed on the kingpin of FIG. 3.
Figure 6:
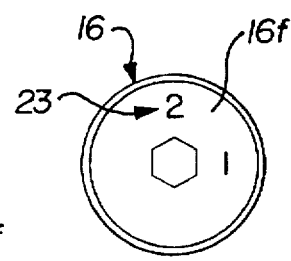
Figure 7:
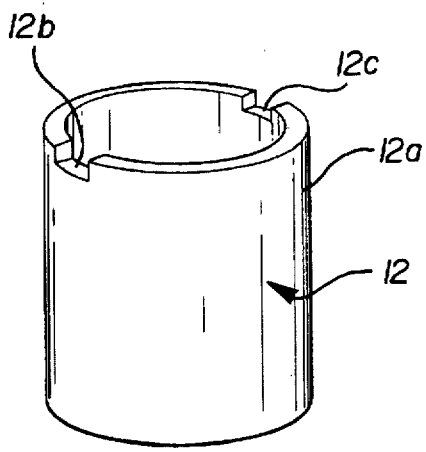
FIG. 7 is a detail perspective view of a bushing employed in the vehicle steering assembly.
Figure 8:
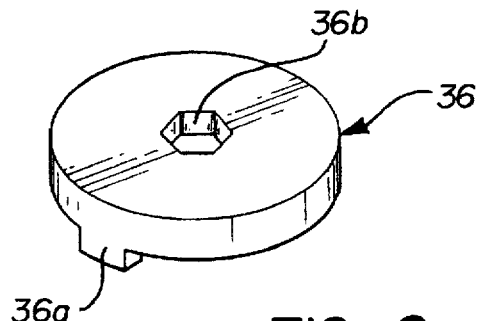
FIG. 8 is a detail perspective view of a spanner wrench for use in angularly adjusting the bushing of FIG. 7.
Figure 9:
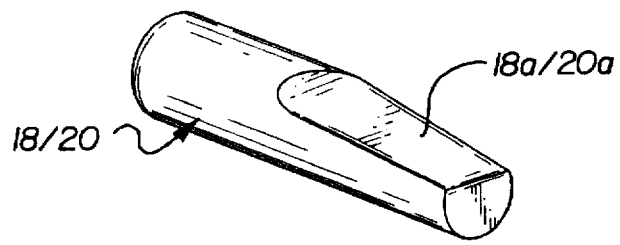
FIG. 9 is a detail perspective view of a lock pin employed in the steering assembly.
Figure 10:
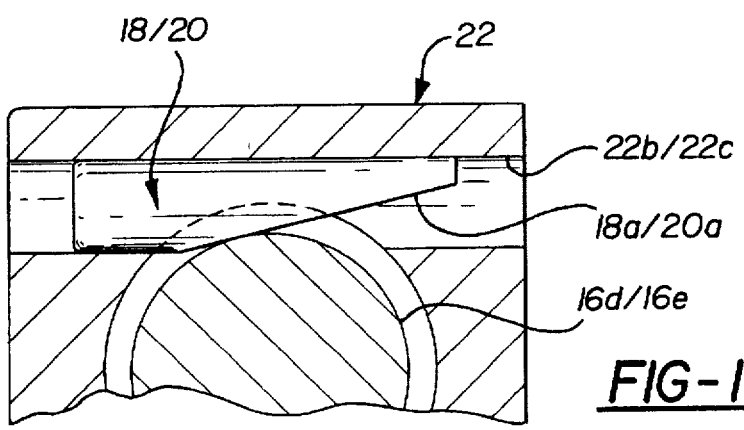
FIG. 10 is a detail view showing the locking action of the lock pin.

With reference to FIGS. 1–12, the invention steering assembly, broadly considered, includes a steering knuckle 10, upper and lower bushings 12 and 14, a kingpin 16, lock pins 18 and 20, and an axle 22.

Steering knuckle 10 is of known form and includes a spindle 10a for mounting of a vehicle wheel and vertically spaced upper and lower yoke arms 10b and 10c defining vertical bores 10d and 10e, respectively.

Bushings 12 and 14 may be formed, for example, of bronze and each includes a cylindrical main body annular portion 12a, 14a. Upper bushing 12 includes a pair of diametrically opposed notches 12b, 12c formed in the upper peripheral edge of the bushing and lower bushing 14 includes a pair of diametrically opposed notches 14b, 14c formed in the lower peripheral edge of the bushing. Bushings 12, 14 are sized to fit snugly in bores 10d and 10e, respectively.

Kingpin 16 is formed of a suitable hardened steel and includes an upper portion 16a journaled in bushing 12, a lower portion 16b journaled in bushing 14, and an intermediate portion 16c positioned between upper and lower end portions 16a and 16b. A pair of upper and lower external circumferential grooves 16d and 16e are provided at axially spaced locations in intermediate portion 16c. Suitable indicia 23 are provided on the upper end face 16f of the kingpin to indicate the angular position of the kingpin relative to the axle. For example, as viewed in FIG. 12, a numeral 1 may be positioned at the 12 o'clock position on the face 16f of the kingpin and a numeral 2 may be positioned at the 9 o'clock position on the face 16f. Face 16f is further provided with a central socket 16g for receipt of a suitable tool such for example as the Allen head wrench 24 shown in FIG. 2.

Axle 22 is of known form and includes a vertical bore 22a at each end of the axle for receipt of a respective kingpin 16 with the intermediate portion 16c of each kingpin positioned in bore 22a and the upper and lower kingpin portion 16a, 16b projecting upwardly and downwardly from the axle.

Each axle end further includes a pair of transverse bores 22b, 22c for respective receipt of lock pins 18, 20. Bores 22b, 22c are spaced vertically by a distance corresponding to the vertical spacing of kingpin grooves 16d, 16e and are spaced laterally by a distance generally corresponding to the diameter of the grooves 16d, 16e so that, as best seen in FIG. 1, pins 18 and 20 may be slidably inserted into transverse bores 22b, 22c for locking engagement with grooves 16d, 16e respectively with flats 18a/20a on the pins 18/20 lockingly engaging with grooves 16d/16e to lock the kingpin in any desired position of angular adjustment relative to the axle.

It will be understood that pins 18 and 20 may take various forms and may even include threaded ends (not shown) which extend out of the distal ends of bores 22b/22c for engagement by suitable nuts whereby to lock the pins positively in position. It will be understood that pins 18/20 are moved into and out of locking disposition with respect to grooves 16/16e by suitable drift tools engaging one or both ends of the pins via transverse bores 22b/22c. It will be seen that the lock pins at any point of angular adjustment of the kingpin have a line contact with a point on the kingpin. The lock pins are preferably made of a material that will elastically deform when wedged into contact with the kingpin so that the kingpin is firmly held in any angular position thereof in the assembly.

As best seen in FIG. 1, bushings 12 and 14 are fitted snugly in bores 10d and 10e; kingpin 16 is fixedly secured with respect to axle 22 by lock pins 18 and 20 passing through transverse bores 22b/22c for locking engagement with grooves 16d/16e so that the upper and lower end portions of the kingpin project fixedly above and below the end of the axle; the upper portion 16a of the kingpin is journaled in bushing 12; and the lower portion of the kingpin is journaled in bushing 14.

As further best seen in FIG. 1, the steering assembly is completed in known manner by a thrust bearing 26 positioned in surrounding relation to the kingpin between the lower face of axle 22 and the upper face of yoke arm 10c; spacer shims 28 positioned in surrounding relation to the kingpin between the upper face of axle 22 and the lower face of yoke arm 10b; and upper and lower end caps 30 and 32 positioned on the upper face of yoke arm 10b and the lower face of yoke arm 10c, respectively, utilizing suitable fasteners 34.

It will be understood that upper yoke arm 10b and lower yoke arm 10c coact in known manner with a steering arm and a tie rod arm, respectively, which in turn coact with a drag link and a cross tube to provide steering of the wheel associated with spindle 10a with the turning movement of the wheel occurring about the central axis of the kingpin.

Because of the cantilever nature of the kingpin relative to the axle and the steering knuckle, the wear occurring between the upper and lower portions of the kingpin and the bushings 12 and 14 is not uniform throughout the circumference of the interface between the kingpin and the bushings but rather is maximum proximate the outboard face of the upper portion 16a of the kingpin and proximate the inboard face of the lower face 16b of the kingpin as indicated by the maximum wear arrows X of FIGS. 1 and 12. Conversely, the minimum amount of wear between the kingpin and the bushings occurs at minimal wear points Y which are diametrically opposed to the maximum wear points X and occur on the inboard face of the upper kingpin portion 16a and the outboard face of the lower kingpin portion 16b.

It will be understood that most heavy duty trucks undergo routine inspection procedures at relatively fixed intervals and that one of the inspections routinely performed relates to play in the kingpin assembly as determined, for example, by dial indicators arranged between the axle and the steering knuckle responsive to movement of the top of the tire side to side to indicate play in the kingpin assembly. Traditionally, when the dial indicator moves a total of 0.010 inches, replacement of the kingpin assembly is indicated. In the prior art steering assemblies, the following steps are performed to replace the kingpins and bushing when wear has been detected by inspection:

(1) the axle is jacked up
(2) the wheel is suitably supported
(3) the upper and lower end caps are removed
(4) the lock pins are tapped or pulled out
(5) the kingpin is dropped out and discarded
(6) the thrust bearing and spacer shims are removed
(7) the upper and lower bushings are pressed out or tapped out and discarded
(8) the upper and lower bushings are replaced with new bushings positioned in the respective steering knuckle bores
(9) the bottom end cap is reinstalled
(10) the thrust bearing is reinstalled
(11) the shims are reinstalled
(12) the new kingpin is dropped in place
(13) the lock pins are reinserted and, after manipulation, are reengaged circumferentially and axially with the axially spaced and diametrically opposed flats on the kingpin
(14) the top end cap is reinstalled, and
(15) the assembly is greased utilizing a fitting (not shown) associated with the upper end cap.

With the invention steering assembly, and assuming again that wear has been detected by a routine inspection, the following steps are performed:

(1) the upper end cap 30 is removed
(2) the lock pins are loosened
(3) Allen head wrench 24 is inserted into kingpin socket 16g and turned through 90° to turn the kingpin through 90°
(4) the lock pins are tightened
(5) the circumferentially spaced fingers 36a of a spanner wrench 36 (FIG. 8) are engaged with the notches 12b/12c of the bushing 12 and Allen head wrench 24 is inserted into a central socket 36b of the spanner wrench to turn the upper bushing through 90°
(6) this procedure is repeated with respect to the lower bushing 14 by removing the lower end cap 32 and utilizing the spanner wrench 36, and
(7) the upper and lower end caps are replaced.

The steering assembly is now ready for a second period of usage which should generally correspond in length to the first period of usage. For example, if the first period of usage prior to rotation of the kingpin and bushings is 150,000 miles, the second period of usage before the kingpin and bushings must be replaced will also approximate 150,000 miles.

It will be understood that when the kingpin is initially installed, the kingpin is rotated using the Allen head wrench 24 to an angular position in which the number 1 indicia on the top face of the kingpin points forwardly relative to the vehicle and the number 2 points laterally outward. When the kingpin is later rotated to expose the new wear surfaces and move the maximum wear points to the minimum wear points, the kingpin is rotated 90° so that the number 2 now points forwardly of the vehicle and the number 1 points laterally inward. The numbers 1 and 2 thus indicate whether the kingpin is in its first or second period of usage and also measure and confirm the rotation of the kingpin through 90° when the kingpin is rotated after the first period of usage.

The invention procedure, as opposed to the prior art procedure, generates considerable cost savings both in terms of part costs and labor costs. Specifically, whereas it typically takes a full day to perform the 15 step process to replace the kingpin and bushing set according to the old procedure, the rotation of the kingpin and bushings according to the invention procedure can be performed in less than one hour. Further, since the invention procedure doubles the life of the kingpin and bushings, the cost of the kingpin and bushing kit (typically $25 per kingpin and bushing kit) represents a further cost saving.

Further, the new kingpin may be manufactured for significantly less cost than the prior art kingpin. Specifically, the new kingpin can be manufactured totally on a screw machine whereas the old pin requires operations on a screw machine followed by further operations on a broaching machine. Specifically, the need to remove the kingpin from the screw machine and place it in the broaching machine for operation in the broaching machine to form the flats on the kingpin adds considerably to the cost of the prior art kingpin and allows the new kingpin to be manufactured at a cost that is less than that of the prior art pin while simultaneously offering the feature of facilitating the rotation of the kingpin to double the pin life.

Note further that it is considerably easier according to the invention to initially install a new kingpin since the invention kingpin, by virtue of the continuous circumferential grooves, requires only that the lock pins and grooves be axially aligned whereas, with the old kingpin, it is necessary that the flats on the kingpin be aligned both axially and circumferentially with the lock pins before the lock pins may be repositioned in locking engagement with the kingpin.

Further, after the initial period of wear, angularly repositioning the kingpin requires only that the lock pins be loosened with respect to the grooves in the kingpin, whereafter, following rotation of the kingpin to its new angular position, the lock pins may simply be tightened with respect to the grooves. In the prior art, by contrast, installation of a new kingpin following kingpin wear again requires that the flats on the kingpin be aligned both axially and circumferentially with the lock pins before the lock pins may be repositioned in locking engagement with the kingpin.

Although annular grooves in the kingpin are generally preferred to minimize manufacturing costs and facilitate assembly and disassembly, there may be situations where it would be desirable to provide the kingpin rotation feature by providing additional broached flats on the kingpin at diametrically opposed locations to the existing axially spaced and diametrically opposed flats. This arrangement, which is shown in the modified kingpin of FIGS. 13 and 14, might be considered for example in a situation where the kingpin manufacturer is already set up to perform broaching operations on the kingpin so that the formation of the additional broached flats would not represent a significant additional cost.

The modified kingpin 40 of FIGS. 13 and 14 includes first and second axially spaced pairs 42, 44 of broached flats with the flats of each pair being axially coincident and angularly spaced. Specifically, pair 42 includes a first flat 46 and a second flat 50 spaced 90° counterclockwise (as viewed from the left of FIG. 14) from the first flat 46, and pair 44 includes a first flat 48 diametrically opposed to the first flat 46 of the first pair of flats and a second flat 52 spaced 90° counterclockwise from first flat 48 and diametrically opposed to the second flat 50 of the first pair of flats.

In the use of the kingpin 40 in carrying out the invention, lock pins 54, 56 are initially engaged with flats 46, 48 and, after the lock pins have been withdrawn and the kingpin rotated 90° to its new wear position utilizing socket 58, the lock pins are engaged with flats 50, 52.

As with the kingpin of FIGS. 1–12, the indicia 1 on the end of the kingpin initially faces forwardly of the vehicle to indicate that the kingpin is in its initial angular position relative to the axle and the indicia 2 faces forwardly of the vehicle to indicate that the kingpin has been rotated to its new wear position.

The bushings are rotated 90° to their new wear position following rotation of the kingpin.

The invention will be seen to provide an improved steering assembly and an improved methodology for prolonging the life of the components of a steering assembly.

Whereas preferred embodiments of the invention have been illustrated and described in detail, it will be apparent that various changes may be made in the disclosed embodiments without departing from the scope or spirit of the invention.

I claim:

1. A motor vehicle steering assembly comprising a steering knuckle including a spindle for mounting a vehicle wheel and upper and lower yoke arms vertically spaced to receive the free end of an axle therebetween and respectively defining upper and lower bores; upper and lower bushings in the upper and lower bores; a kingpin having upper and lower portions journaled in the upper and lower bushings and an intermediate portion passing through a vertical bore in the axle free end; and at least one lock pin adapted to pass through a transverse bore in the axle free end for locking coaction with locking means on the intermediate portion of the kingpin; characterized in that:

the assembly includes indicia means on the kingpin indicating the angular position of the kingpin relative to the axle and means for rotating the kingpin to a new angular position relative to the axle in compensation for wear between the kingpin and the bushings.

2. The steering assembly according to claim 1 wherein the rotating means comprises a socket provided in one end of the kingpin for receipt of a suitable tool.

3. The steering assembly according to claim 1 wherein the kingpin locking means comprises an external circumferential groove in the intermediate portion of the kingpin for coaction with the lock pin.

4. A steering assembly according to claim 3 wherein there are two lock pins and two axially spaced circumferential grooves are provided in the kingpin for respective locking coaction with the two lock pins.

5. A steering assembly according to claim 1 wherein the kingpin locking means comprises a pair of angularly spaced and axially coincident flats on the intermediate portion of the kingpin for coaction with the lock pin.

6. A steering assembly according to claim 5 wherein:

there are two lock pins and two axially spaced pairs of angularly spaced and axially coincident flats on the kingpin; and each lock pin engages a first flat of each pair of flats in the original angular position of the kingpin and a second flat of each pair in the new angular position of the kingpin.

7. A steering assembly according to claim 1 wherein the assembly further includes means for rotating the bushings relative to the respective yoke arm so as to selectively alter the angular position of the bushings relative to the axle in compensation for wear between the kingpin and the bushings.

8. A steering assembly according to claim 7 wherein the bushing rotating means comprises notches in an outboard peripheral edge of each bushing for engagement by a suitable tool.

9. A motor vehicle steering assembly comprising:

a steering knuckle including a spindle for mounting a vehicle wheel and upper and lower yoke arms vertical spaced to receive a free end of an axle therebetween and respectively defining upper and lower bores;

upper and lower bushings respectively positioned in the upper and lower bores;

a kingpin having an upper portion journaled in the upper bushing, a lower portion journaled in the lower bushing, an intermediate portion passing through a vertical bore in the axle free end, and an external circumferential groove in the intermediate portion;

a lock pin adapted to pass through a transverse bore in the axle free end for locking coaction with the circumferential groove;

indicia on one end of the kingpin indicating the angular position of the kingpin relative to the axle; and means on one end of the kingpin for rotating the kingpin to a new angular position relative to the axle in compensation for wear between the kingpin and the bushings.

10. A steering assembly according to claim 9 wherein the assembly further includes means for rotating the bushings relative to the respective yoke arm so as to selectively alter the angular position of the bushings relative to the axle in compensation for wear between the kingpin and the bushings.

11. A steering assembly according to claim 10 wherein the bushing rotating means comprises notches in an outboard peripheral edge of each bushing for engagement by a suitable tool.

12. A steering assembly according to claim 10 wherein the kingpin rotating means comprises a socket provided in the one end of the kingpin for receipt of a suitable tool.

13. A steering assembly according to claim 10 wherein there are two lock pins and two circumferential grooves are provided in the intermediate portion of the kingpin for respective locking coaction with the two lock pins.

14. A motor vehicle steering assembly comprising:

a steering knuckle including a spindle for mounting a vehicle wheel and upper and lower yoke arm vertically spaced to receive a free end of an axle therebetween and respectively defining upper and lower bores;

upper and lower bushings respectively positioned in the upper and lower bores and each having notches in an outboard peripheral edge thereof for engagement by a suitable tool to rotate the bushings relative to the steering knuckle;

a kingpin having an upper portion journaled in the upper bushing, a lower portion journaled in the lower bushing, an intermediate portion passing through a vertical bore in the axle free end and first and second axially spaced external circumferential grooves in the intermediate portion;

first and second lock pins adapted to pass through transverse bores in the axle free end for respective locking coaction with the circumferential grooves;

indicia on one end of the kingpin indicating the angular position of the kingpin relative to the axle; and a socket in one end of the kingpin for receipt of a suitable tool to rotate the kingpin relative to the axle.

15. For use with a motor vehicle steering assembly comprising a steering knuckle including a spindle for mounting a wheel and upper and lower yoke arms vertically spaced to receive a free end of an axle therebetween and respectively defining upper and lower bores, and a lock pin for passing through a bore in the axle free end;

a kingpin kit including a kingpin having an upper end portion for journaling in the upper bore, a lower end portion for journaling in the lower bore, an intermediate portion for passage through a bore in the axle free end, a circumferential groove in the intermediate portion for coaction with the lock pin, indicia on one end of the kingpin indicating and confirming the angular position of the kingpin relative to the axle, and means on the kingpin for coaction with a suitable tool to rotate the kingpin to a new angular position relative to the axle in compensation for wear.

16. A kingpin kit according to claim 15 wherein the kingpin rotating means comprises a socket in one end of the kingpin.

17. A kingpin kit according to claim 15 wherein the kingpin kit further includes upper and lower bushings for positioning in the upper and lower bores for journaling the upper and lower end portions of the kingpin, each bushing including means for rotating the bushing relative to the axle in compensation for wear between the kingpin and the bushings.

18. A kingpin kit according to claim 17 wherein the bushing rotating means includes notches in an outboard peripheral edge of each bushing for coaction with a suitable tool to rotate the bushings.

19. A method of increasing the wear life of a kingpin for use in a motor vehicle steering assembly of the type including a steering knuckle having a spindle for mounting a wheel and upper and lower yoke arms vertically spaced to receive a free end of an axle therebetween and respectively defining upper and lower bores; upper and lower bushings respectively positioned in the upper and lower bores; a kingpin having upper and lower portions journaled in the upper and lower bushings and an intermediate portion between the upper and lower portions positioned in a vertical bore in the free end of the axle; and a lock pin passing through a transverse bore in the axle free end for locking coaction with the kingpin intermediate portion to preclude rotation of the kingpin relative to the axle, the method comprising:

providing indicia means proximate one end of the kingpin to indicate and confirm the angular position of the kingpin relative to the axle;

providing means proximate one end of the kingpin to rotate the kingpin relative to the axle;

mounting the kingpin in the steering assembly with the upper portion journaled in the upper bushing, the lower portion journaled in the lower bushing, and the intermediate portion passing through the vertical bore in the axle free end with the lock pin lockingly engaging the intermediate portion to lock the kingpin in an original angular position relative to the axle as determined and confirmed by the indicia means; and after a period of usage of the steering assembly sufficient to generate wear as between the kingpin portions and the respective bushings, moving the lock pin to an unlocked position with respect to the intermediate portion of the kingpin, utilizing the rotating means to rotate the kingpin to a new angular position relative to the axle as determined and confirmed by the indicia means, and moving the lock pin to a locked position with respect to the intermediate portion of the kingpin to lock the kingpin in its new angular position relative to the axle.

20. A method according to claim 19 including the further steps of:

providing a circumferential groove in the intermediate portion of the kingpin for locking coaction with the lock pin;

loosening the lock pin with respect to the circumferential groove to achieve the unlocked position of the lock pin; and following rotation of the kingpin to its new angular position, tightening the lock pin with respect to the circumferential groove to achieve the locked position of the lock pin.

21. A method according to claim 19 including the further steps of:

providing a pair of first and second angularly spaced flats on the intermediate portion of the kingpin for locking coaction with the lock pin;

utilizing the first flat to lockingly engage the intermediate portion of the kingpin with the kingpin in its original angular position relative to the axle; and utilizing the second flat to lockingly engage the intermediate portion of the kingpin with the kingpin in its new angular position relative to the axle.

22. A method according to claim 19 wherein the method includes the further steps of:

providing means on each bushing to rotate the respective bushing relative to the axle; and after the period of usage, rotating the bushings to new angular positions relative to the axle.

23. A method according to claim 22 wherein the kingpin and the bushings are rotated after the period of usage by approximately equal angular extents.

24. A method according to claim 23 wherein the kingpin and the bushings are rotated after the period of usage through approximately 90°.

* * * * *